(12) United States Patent
Seiberts et al.

(10) Patent No.: US 9,102,296 B2
(45) Date of Patent: *Aug. 11, 2015

(54) RELAY ATTACK PREVENTION FOR PASSIVE ENTRY/PASSIVE START SYSTEMS

(71) Applicant: TEXAS INSTRUMENTS INCORPORATED, Dallas, TX (US)

(72) Inventors: Klaus Seiberts, Sugar Land, TX (US); Jim Childers, Missouri City, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 137 days.

This patent is subject to a terminal disclaimer.

(21) Appl. No.: 13/924,908

(22) Filed: Jun. 24, 2013

(65) Prior Publication Data

US 2014/0375420 A1 Dec. 25, 2014

(51) Int. Cl.
*B60R 25/00* (2013.01)
*B60R 25/20* (2013.01)

(52) U.S. Cl.
CPC ................................. *B60R 25/2072* (2013.01)

(58) Field of Classification Search
CPC ........ B60R 25/20; B60R 25/24; B60R 25/00; G07C 9/00309; G07C 9/00; G07C 2209/63; G07C 2209/08; G07C 9/00182
USPC .............. 340/5.6, 5.61, 5.64, 5.2, 5.22, 5.72, 340/5.71
See application file for complete search history.

(56) References Cited

U.S. PATENT DOCUMENTS

| | | | |
|---|---|---|---|
| 2010/0127836 A1* | 5/2010 | Huang et al. | 340/10.5 |
| 2014/0203907 A1* | 7/2014 | Ohata et al. | 340/5.61 |
| 2014/0285319 A1* | 9/2014 | Khan et al. | 340/5.61 |
| 2014/0340193 A1* | 11/2014 | Zivkovic et al. | 340/5.61 |

* cited by examiner

*Primary Examiner* — Nabil Syed
(74) *Attorney, Agent, or Firm* — Tuenlap D. Chan; Frank D. Cimino

(57) ABSTRACT

A keyfob is disclosed for use in detecting an attack on a vehicle. The keyfob includes a microcontroller, a wake receiver and an accelerometer. The wake receiver is configured to measure received signal strength and save the measured value in received signal strength indicator (RSSI). The accelerometer is used to generate acceleration data. The microcontroller detects an attack based on the RSSI and the acceleration data.

5 Claims, 4 Drawing Sheets

RELAY ATTACK PREVENTION FOR PASSIVE ENTRY/PASSIVE START SYSTEMS

CROSS-REFERENCE TO RELATED APPLICATION

N/A.

BACKGROUND

Automotive keyless entry systems, especially Passive Entry/Passive Start (PEPS) systems, have been facing a threat referred to as a "relay attack", which permits a vehicle to be opened and possibly stolen without the owner's awareness.

The relay attack requires two thieves working in cooperation with each other. Each of the two thieves carries a device (referred to as an attack kit) capable of receiving a signal from either the vehicle or the vehicle's keyfob and forwarding the received signal to the other thief after amplifying the signal. In one scenario, the thieves follow the vehicle and its driver. The driver stops at, for example, a store or a restaurant. Thief-1 stands adjacent to the parked vehicle and thief-2 follows and stands next to the owner of the vehicle (which may be inside the store or restaurant). Thief-1 pushes a button on the vehicle's door to initiate a door unlock operation, which normally requires a valid keyfob to be within a foot or two of the door. Upon pressing the door button, the vehicle broadcasts a wireless signal intended for reception by a valid, nearby keyfob.

The wireless device carried by thief-1 picks up the wireless signal being broadcast by the vehicle and relays the signal (albeit possibly at a different power level or frequency) through thief-1's attack kit to the attack kit of thief-2. Upon receiving the signal from thief-1, thief-2 replicates the signal in the format commensurate with the keyfob and transmits the replicated keyfob-compliant signal to the keyfob carried by the vehicle's owner (which presumably is within sufficient range of thief-2); thereby waking up the keyfob. The keyfob which receives the wireless signal and cannot distinguish thief-2's attack kit from the vehicle itself considers the attack kit carried by thief-2 as the vehicle and, as it is configured to do, transmits a wireless response signal to authenticate the keyfob to the vehicle. This response signal is then received by the attack kit of thief-2 which relays the signal back to the attack kit of thief-1. Thief-1 receives the response and replicates a wireless signal compatible with the vehicle. The vehicle's wireless communication system cannot distinguish a wireless signal from the attack kit of thief-1 from the keyfob itself and performs the designated operation (e.g., door unlock).

SUMMARY

In accordance with various embodiments, a keyfob with an integrated accelerometer in detecting an attack on a vehicle and a method used therein are disclosed. The keyfob comprises a microcontroller, a wake receiver to receive wireless signals from the vehicle and to measure the received signal strength (the resulting measured value called the received signal strength indicator (RSSI)), an accelerometer to generate acceleration data based on motion of the keyfob, in which the microcontroller detects an attack based on the RSSI and the acceleration data. The wake receiver is disabled by the microcontroller if the keyfob is stationary and outside wireless range ascertained by transceivers installed in the vehicle; thereby eliminating a possibility of an attack. Further, while the keyfob is within the wireless range, an attack can be detected based on whether a difference between the distance computed based on the acceleration data from the accelerometer and the distance calculated based on the RSSI is greater than a threshold.

A disclosed method to operate the disclosed keyfob to detect an attack comprises measuring a received signal strength indicator (RSSI) and receiving acceleration data from an accelerometer. If the keyfob is out of the wireless range of a vehicle, the microcontroller in the keyfob disables a wake receiver. If the keyfob is within the wireless range as mentioned above, the microcontroller computes the RSSI and acceleration data at two different points in time to determine whether an attack has occurred based on the RSSI and acceleration data.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect connection via other devices and connections.

As used herein, the term "vehicle" includes any type of vehicle that can be driven such as automobiles, trucks, and busses, as well as boats, jet skis, snowmobiles, and other types of transportation machines that are operable with a wireless keyfob.

As used herein, the term "transceiver" includes any type of wireless communication units such as transmitters, receivers, or a combination of a transmitter and a receiver.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1A:
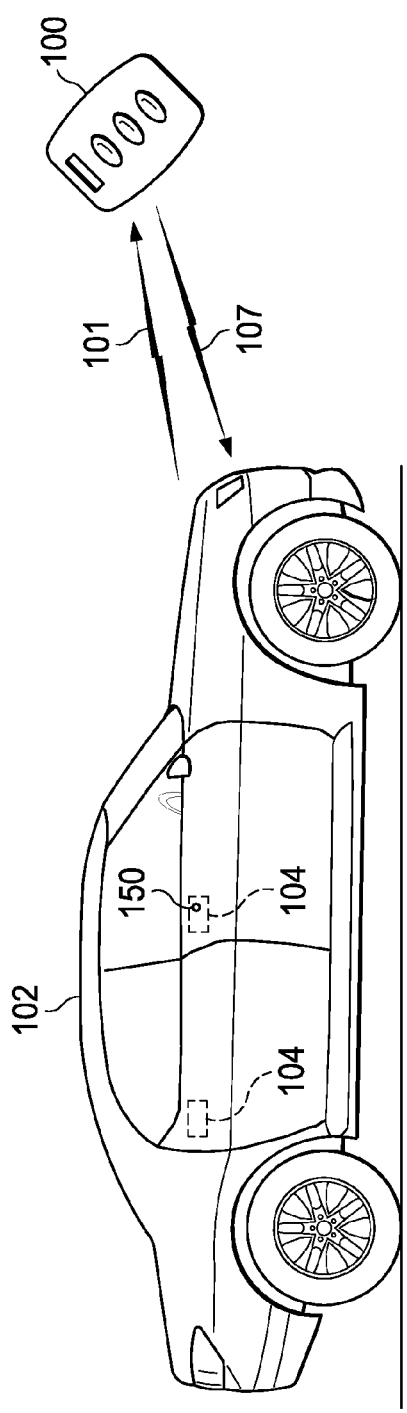
FIG. 1a illustrates a keyfob in a PEPS system for use with a vehicle in accordance with the disclosed principles.

Shown diagrammatically in FIG. 1A is an arrangement of a passive entry/passive start (PEPS) system. As illustrated, the PEPS system includes a vehicle 102 with a plurality of wireless transceivers 104 installed at various locations around the vehicle (e.g., inside each door near the door handles, in the trunk, etc.) and a PEPS keyfob 100 which might be carried by an operator of the vehicle 102. The keyfob 100 may be configured to lock and unlock a door or the trunk and to start the vehicle. The keyfob 100 performs wireless communication with a wireless transceiver 104 when the keyfob 100 is close enough to the transceiver 104. The keyfob 100 authenticates itself to the vehicle in order for the vehicle to provide the desired functionality (e.g., door locking or unlocking or engine starting).

Each transceiver 104 has the capability of transmitting a low frequency (LF) signal 101 which is received by the keyfob 100 if the keyfob is within wireless range of at least one of the vehicle's transceivers 104. Upon receiving the LF signal 101, the keyfob transmits an ultra-high frequency (UHF) signal 107 which is received by at least one of the vehicle's transceivers 104. The frequency band of the LF signals may be between 100 kHz and 150 kHz; and the UHF band may be between 300 MHz and 1000 MHz.

Figure 1B:
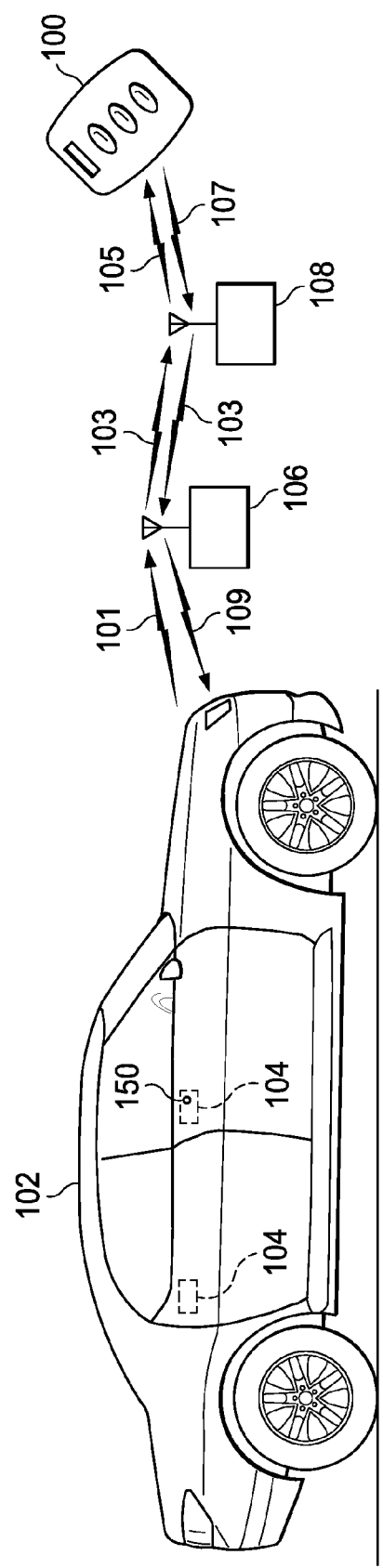
FIG. 1b schematically represents a "relay attack" in a PEPS system.

FIG. 1b depicts a possible configuration for carrying out a relay attack. For this purpose, an additional transmission link 103 is introduced in a regular PEPS system shown in FIG. 1a, which is accomplished via at least two additional "relay attack kits" 106 and 108. The first relay attack kit 106 acts as an emulator for the keyfob 100 and the second relay attack kit 108 as an emulator for the vehicle 102 through the transmission link 103 between the first attack kit 106 and the second attack kit 108.

More specifically, the first attack kit 106 preferably is brought by a thief when sufficiently close proximity of the vehicle 102 to receive LF signal 101 from the vehicle's transceiver 104. A thief using first attack kit 106 presses the door unlock button 150 on the vehicle's door to begin the unlock/attack process. The vehicle responds by transmitting a LF signal 101 with the expectation that a valid keyfob is nearby. Via the transmission link 103 between the attack kits, attack kit 106 relays the vehicle's signal 101 to the second relay attack kit 108 (perhaps on a different frequency and with greater transmission power than LF signal 101). The second attack kit 108 is within close proximity of the keyfob. Upon the second relay attack kit 108 receiving the vehicle's signal 101 from the first attack kit 106, the second attack kit 108 generates a LF signal 105 to be received by the keyfob 100. The keyfob 100 receives the LF signal from the second attack kit 108 and, unaware, that the signal originated from an attack kit instead of a vehicle, starts to authenticate itself to the vehicle by transmitting the UHF signal 107. Sharing the same operation principle described above, the relay attack kit 108 located close to the keyfob 100 emulates the signal 107 and relays the signal 107 to the first attack kit 106 (near the vehicle) via the transmission link 103. The attack kit 106 transmits an UHF signal 109 copying the content of the original signal 107 from the keyfob in order to cause the vehicle 102 to be tricked into believing that the attack kit 106 is an authentic keyfob 100.

Still referring to FIG. 1b, the transmission link 103 between the relay attack kits 106 and 108 may have at least one bi-directional transmission channel of any desired type that allows there to be a distance between the relay attack kits 106 and 108 that is greater than the maximum distance permitted between the vehicle's transceivers 104 and a keyfob in direct communication with the transceivers 104.

In wireless communications, a received signal strength indicator (RSSI) is indicative of a measurement of field strength in power of a received wireless signal and is typically measured in negative numbers in units of dB. An RSSI closer to zero indicates that the signal strength received is stronger than RSSIs farther from zero. Further, as widely known, power dissipates from a point source as it moves further out and the relationship between power and distance is that the power (e.g., RSSI) is inversely proportional to the distance traveled.

Figure 2:
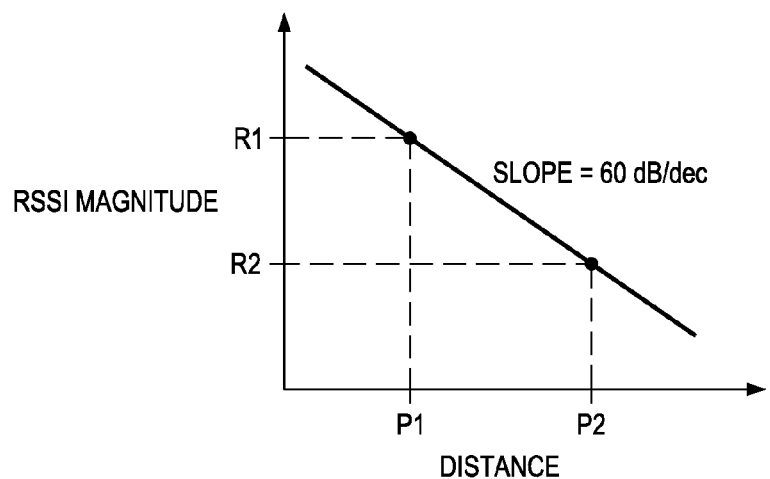
FIG. 2 shows a plot of received signal strength indicator (RSSI) magnitude as a function of distance.

FIG. 2 illustratively shows a plot of RSSI magnitude as a function of a distance measured from the vehicle to the keyfob. In an embodiment, the RSSI magnitude may decline from a source of a signal at a rate of 60 dB/dec. More specifically, the ratio of the RSSI magnitudes (R2/R1) and the ratio of the distances (P2/P1) at two different points, preferably in time, follow the equation, $\log (R2/R1) = 3 \log (P2/P1)$. Therefore, by using this principle, once a microcontroller in the keyfob calculates the RSSI, via the equation of RSSI magnitude versus distance mentioned above, a distance that the keyfob has traveled between two different points in time can be estimated.

Using the RSSI is a way to counter the relay attack in the PEPS system. The vehicle transmits a plurality of LF signals through different transceivers installed in various locations of the vehicle. Then a circuitry (not shown) in the keyfob measures the RSSI of those multiple LF signals from the vehicle and a microcontroller in the keyfob or the vehicle determines whether an attack has been underway based on a presence of discrepancy between the measured RSSI and expected RSSI. However, relying on RSSI solely is vulnerable to prevent an attack due to a commensurate advancement of technologies in relay attack kits. For instance, if thieves can fully mimic the expected signal strength, the PEPS system may still be susceptible to a relay attack.

Embodiments of the invention are directed to a keyfob with an integrated accelerometer (and corresponding method) to detect a relay attack in a PEPS system. The keyfob uses the accelerometer to generate acceleration data between two different points in time based on the movement of the keyfob, thereby estimating a distance that the keyfob travels between the two points in time. Furthermore, a wake receiver is disabled to completely prevent an attack based on the acceleration data from the accelerometer.

Figure 3:
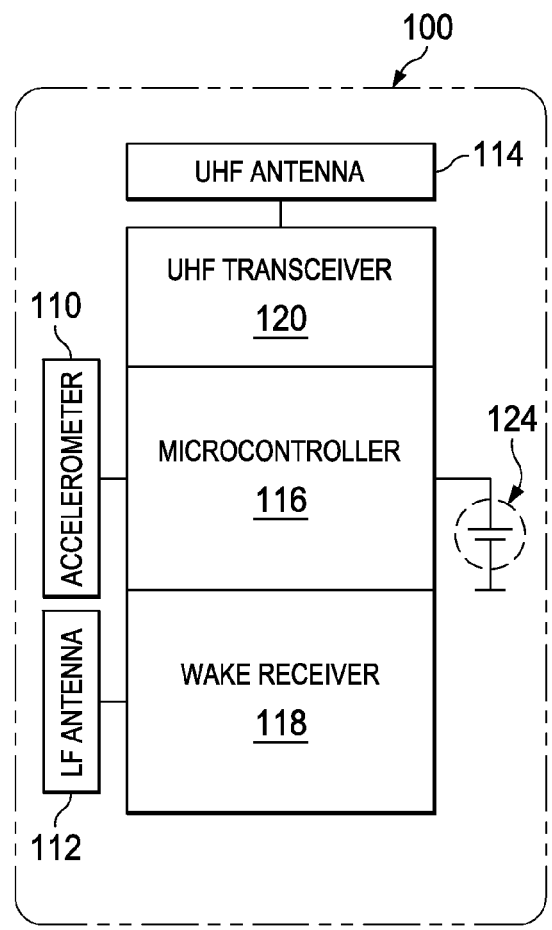
FIG. 3 shows a block diagram of an illustrative keyfob in accordance with the disclosed principles.

FIG. 3 illustrates a block diagram of PEPS keyfob 100. As shown, the keyfob in this example includes an accelerometer 110, one or more LF antennas 112, one or more UHF antennas 114, a UHF transceiver 120, a microcontroller 116, a wake receiver 118, and a battery 124. In the preferred embodiment shown, the integrated accelerometer 110 is used to detect motion of the keyfob 100 and generates acceleration data to the microcontroller 116 based on movement of the keyfob 100. Microcontroller 116 controls the overall operation of the keyfob 100. The microcontroller 116 implements multiple power states such as a lower power state and a higher power state. In the higher power state, the microcontroller is fully operational. In the lower power state, the microcontroller is generally incapable of executing instructions but can be woken up by way of, for example, an interrupt. The wake receiver 118 receives signals (if any), through the LF antenna 112 (e.g., from the vehicle's wireless transceivers 104) and, if the microcontroller 116 is in a lower power state, asserts an interrupt signal to awaken the microcontroller based on receipt of LF signals to thereby cause the microcontroller to transition to the higher power mode. The RSSI is calculated by the microcontroller 116 based on the field strength in power of signals received by the wake receiver 118. More particularly, the RSSI may comprise a plurality of data representing power levels of received signals at multiple points in time serially, which are received by the wake receiver 118 via the LF antenna 112. The UHF antenna 114 is used to transmit UHF signals from the UHF transceiver 120 to the vehicle's wireless transceivers 104. Battery 124 provides power to the respective components of the keyfob 100.

Figure 4:
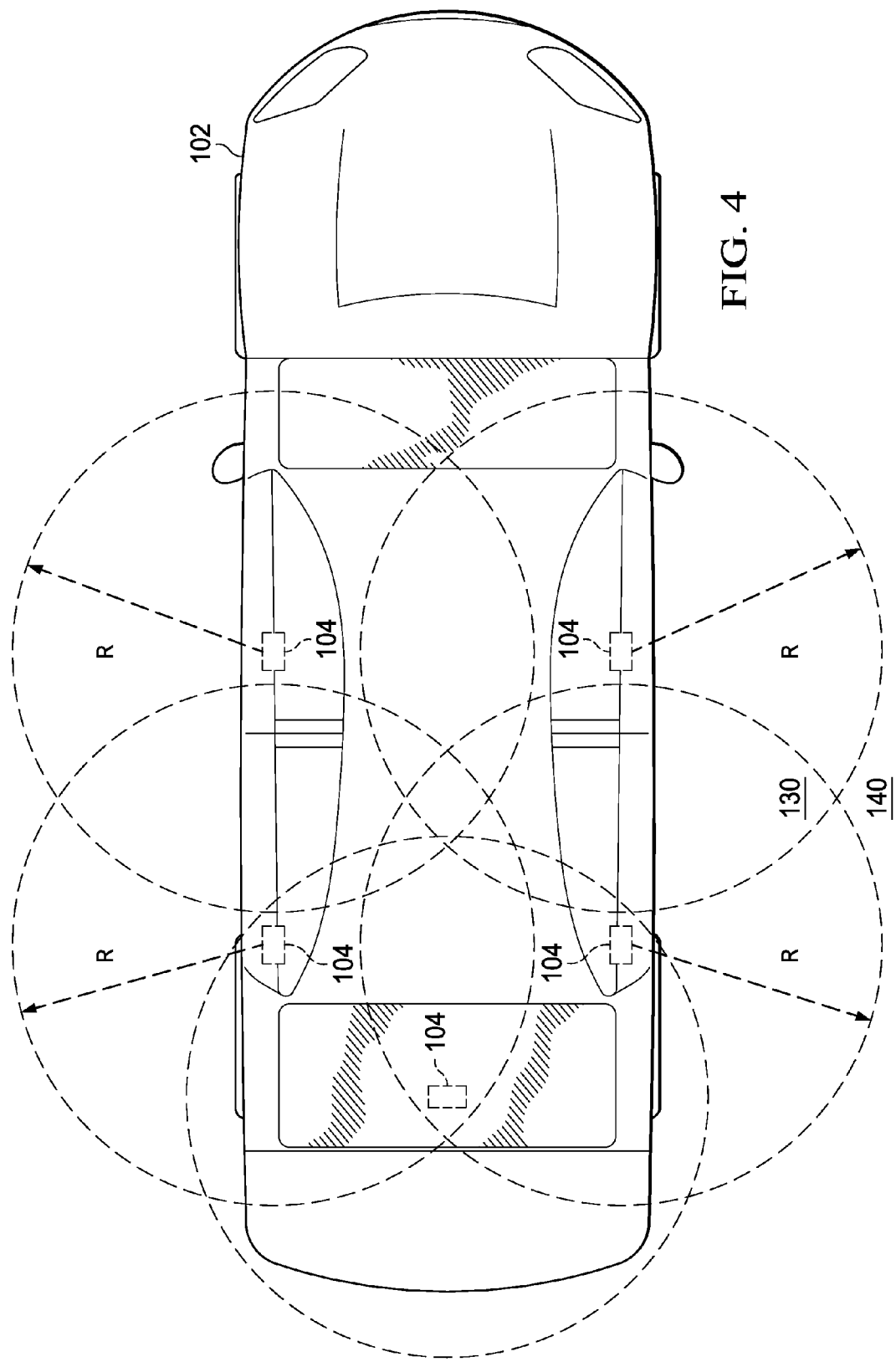
FIG. 4 illustrates multiple locations in which a keyfob is and is not within wireless range of the vehicle in accordance with the disclosed principles.

FIG. 4 illustrates a top view of vehicle 102. The dashed circles around each wireless transceiver 104 indicate the communication range of each transceiver. For example, in FIG. 4, there are five transceivers 104 installed in the vehicle's front doors, rear doors and trunk, respectively. Each transceiver 104 has a predefined wireless range with a radius R as shown. The wireless range of neighboring transceivers may overlap as indicated by overlapping dashed circles.

In accordance with at least some embodiments, the keyfob 100 thwarts a relay attack attempt in any of multiple ways. For example, the keyfob may transition its microcontroller 116 to the lower power mode (and disable the wake receiver 118) if no wireless signals are being detected by the LF antenna and the accelerometer determines that the keyfob is not moving. This situation may be characteristic of a keyfob that is nowhere near the vehicle. Alternatively or additionally, the keyfob may ignore a wireless signal characteristic of the vehicle's LF signals (which legitimately may be received directly from the vehicle itself or may be received from a thief's attack device during a relay attack). The keyfob may ignore an LF signal upon detecting that a sufficiently large mismatch of calculated distance based on the RSSI and the acceleration data. Both of these techniques are described below.

Still referring to FIG. 4, the keyfob 100 preferably switches between multiple (e.g., two) states depending on whether the keyfob is within wireless range of any of the vehicle's transceivers 104 and whether the keyfob is stationary or moving. Two locations 130 and 140 are illustrated for a keyfob in FIG. 4. Location 130 is within the wireless range of at least one of the vehicle's wireless transceivers 104. Location 140 is outside of the wireless range of all the vehicle's transceivers 104. The operation of the keyfob at each location will be explained below.

For location 140, the keyfob 100 is outside the range of the wireless communication of vehicle's transceivers 104. At location 108, the wake receiver 118 will not receive LF signals from the vehicle. Once the microcontroller 116 determines that no LF signals are being received by the wake receiver 118, the microcontroller 116 transitions to a lower power state. While the microcontroller 116 is in the lower power state and the wake receiver 118 is disabled, if the accelerometer 110 detects motion, the accelerometer may generate an interrupt to awaken the microcontroller 116 to a higher power state and enable operation of the wake receiver. The wake receiver 118 thus is able to start receiving LF signals (if any) from the vehicle. The accelerometer 110 may detect the presence of motion of the keyfob 100 in any suitable interval (e.g., once every second). More specifically, the wake receiver 118 can only be enabled to receive LF signals from the vehicle when the accelerometer 110 transitions the microcontroller 116 to the higher power state based on detected motion of the keyfob.

Most keyfobs remain idle (no movement) most of the time. For example, after driving home, the vehicle operator typically places the keyfob down and it remains idle the rest of the night until the following morning. While at work, the keyfob typically remains idle for hours at a time. Thus, for long periods of time, the keyfob is outside the wireless communication range of the vehicle's transceivers 104 and sits idle without being used to operate the vehicle. A explained above, a relay attack can only happen while the wake receiver 118 receives LF signals from the vehicle (or the thief's attack device emulating the vehicle). If the wake receiver 118 in the keyfob is in a disabled state and can only be enabled via the detected motion of the keyfob by the accelerometer 110, then integrating the accelerometer 110 into the keyfob 100 may reduce the possibility of being attacked.

For location 130 in FIG. 4, the keyfob is within wireless range of at least one of the vehicle's transceivers 104. The keyfob's wake receiver 118 is enabled and is able to receive LF signals 101 from the vehicle. The microcontroller 116 responds to the received LF signal by, for example, causing the UHF antenna to transmit a UHF signal 103 back to vehicle to authenticate desired operations (e.g., unlock the door). In this scenario, a thief may not easily steal the vehicle without the owner's awareness. Since the radius R (shown in FIG. 4) of each transceiver 104 is typically around 3 meter, it is common for the vehicle's owner who carries the keyfob to notice an unauthorized person adjacent to the vehicle trying to poll the vehicle.

The accelerometer 110 in the keyfob may also be used to determine whether an attack has been detected based on a difference of distances that the keyfob has traveled estimated by the RSSI and acceleration data from the accelerometer. The use of the accelerometer in this regard is explained below.

During a process to authenticate the keyfob, the RSSI of signals received by the wake receiver 118 at two different points in time t1 and t2 are estimated by the microcontroller 116. Meanwhile, the accelerometer 110 logs the acceleration data into the microcontroller 116 of the keyfob based on its movement between t1 and t2. In some embodiments, t2 may be greater than t1 and t2−t1 may range from 0.5 seconds to 2 seconds. The microcontroller 116 uses the acceleration data generated by the accelerometer 110 to calculate a distance that the keyfob has traveled from t1 to t2 based on the defined relations of distance (x(t)), velocity (v(t)) and acceleration (a(t)), where x(t), v(t) and a(t) are functions of time. More specifically, $v(t)=\int a(t)\,dt$ and $x(t)=\int v(t)\,dt$, mean that through twice integration of the acceleration data between two different points in time t1 and t2, the distance that the keyfob has traveled from t1 to t2 can be calculated. This distance is referred to as a "moving distance." For example, if t2−t1=1 second and the accelerometer has recorded the acceleration data sequentially for 10 times in an equal time interval Δt (in this case, Δt is 0.1 second) from t1 to t2, the microcontroller is able to calculate the distance by numerically integrating the acceleration data based on the formulas, $v(t)=\Sigma \Delta t^*(a(t1+i^*\Delta t)+a(t1+(i+1)^*\Delta t))/2$ (i=0 to 10) and $x(t)=\Sigma \Delta t^*(v(t1+i^*\Delta t)+v(t1+(i+1)^*\Delta t))/2$ (i=0 to 10). Depending on the desired need and the capability of microcontrollers, the time interval within a certain time period can be greater or smaller.

As mentioned above, by using the equation of RSSI magnitude versus distance, a distance of the keyfob from t1 to t2 can also be determined based on the change of received signal strength. In a regular operation of a keyfob, the two distances calculated based on the RSSI and based on the acceleration data respectively should match or, in a preferred embodiment, a difference between these two calculated distances should not be greater than a predefined threshold. If the two moving distances do not sufficiently match, then the keyfob will communicate with the vehicle that possibly a relay attack is underway hence having the vehicle execute additional authentication processes between the vehicle and the keyfob (e.g., triggering at least one process to estimate distances based on the RSSI and the acceleration data) or cause the vehicle to sound an alarm. Alternatively or additionally, the keyfob may not respond to the LF signals which may come from the vehicle or a possible relay attack kit.

Figure 5:
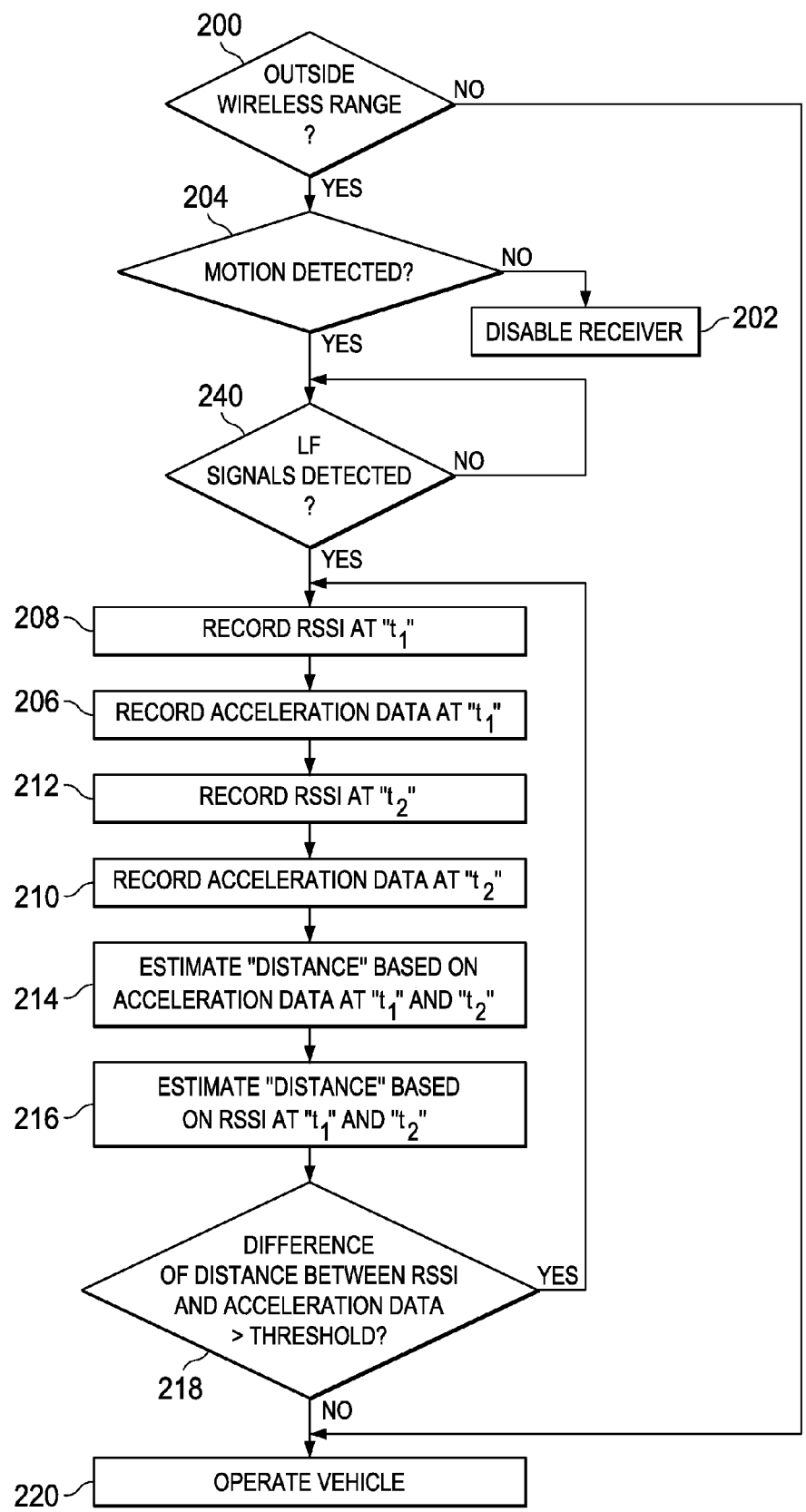
FIG. 5 shows a method in accordance with the disclosed principles.

FIG. 5 shows an example of a method performed by the keyfob to detect an attack. The operations in FIG. 5 may be performed in the order shown or in a different order as desired. Additionally, two or more of the operations may be performed in parallel instead of in series.

At 200, the microcontroller 116 determines whether the keyfob 100 is within the wireless communication range established by any receivers 114 installed in the vehicle 102. If the microcontroller 106 determines that the keyfob is outside the wireless range based on a lack of LF signals 101 received by the wake receiver 118 and, at 204, the accelerometer 110 detects no motion of the keyfob, the microcontroller 106 disables the wake receiver 118 at 202 and transitions the microcontroller itself to the lower power mode. Under this scenario, the wake receiver 118 is then enabled to receive any LF signals from the vehicle by the microcontroller 116 based on detected movement of the keyfob by the accelerometer 110 and thereby the accelerometer 110 generates an interrupt to transition the microcontroller 116 to the higher power state. Then the microcontroller 116 enables the wake receiver 118 to determine whether the keyfob enters into the wireless range (i.e., location 130 in FIG. 4) based on a presence of any detected LF signals 101 from the transceivers 104 in the vehicle. If the wake receiver 118 in the keyfob is disabled, the keyfob has no longer ascertained the wireless communication link between the keyfob and the vehicle, which means that a possibility of being attacked is eliminated.

However, if the accelerometer 110 detects a presence of motion of the keyfob 100, at 204 with still enabled wake receiver 118 and further at 240 there are LF signals being detected by the wake receiver 118, at 208 the microcontroller 116 computes the RSSI based on the field strength of the received signal from the vehicle received by the wake receiver 118 at time, t1, and meanwhile at 206 the accelerometer 110 may start to log the acceleration data into the microcontroller 116 at a point in time, t1. Subsequently, at a different point in time, t2 (t2>t1), as shown in 210, the accelerometer 110 logs the acceleration data into the microcontroller 116 and in 212, the microcontroller 116 computes the RSSI based on the field strength of the received signal from the vehicle received by the wake receiver 118 at time, t2. In a preferred embodiment, the accelerometer 110 continuously logs the acceleration data into the microcontroller every Δt (Δt is a predefined time interval) from t1 to t2.

At 214, the microcontroller 116, via a double integration of the acceleration data from the accelerometer 110, estimates a moving distance that the keyfob has traveled from t1 to t2. At 216, the microcontroller 116 estimates a moving distance that the keyfob has traveled from t1 to t2 based on the equation of RSSI magnitude versus distance, referred to FIG. 2. The microcontroller 116 compares the results of distance from t1 to t2 estimated based on the RSSI and the acceleration data.

At 218, if the microcontroller 116 determines that a difference calculated based on the RSSI and the acceleration data is greater than a predefined threshold (which would likely be indicative of a relay attack), then control loops back to operation 206 (i.e., the microcontroller continues to assess whether an attack exists).

If the difference is within the predefined threshold, at 220, the microcontroller 116 determines that there has been no attack detected and the keyfob is allowed to operate the vehicle.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An apparatus for protecting a vehicle, comprising:
   a wake receiver configured to receive a wireless signal from the vehicle for measuring a received signal strength of the received wireless signal and generating a received signal strength indicator (RSSI); and
   an accelerometer configured to generate acceleration data based on motion of the apparatus;
   a microcontroller configured to detect an attack by comparing the RSSI against the acceleration data, the microcontroller configured to:
   acquire the acceleration data from the accelerometer at two different points in time:
   compute a first distance the apparatus travels between the two different points in time based on the acceleration data;
   calculate a second distance based on the RSSI: and
   determine the attack has occurred if a difference between the first distance and the second distance is greater than a threshold.

2. The apparatus of claim 1 wherein the microcontroller, to eliminate a possibility of an attack, disables the wake receiver based on:
   lack of detection of a wireless signal from the vehicle; and
   lack of motion of the apparatus being detected based on the acceleration data from the accelerometer.

3. A method to detect an attack, comprising:
   measuring, using a microcontroller, a signal strength of a wireless signal received by a wake receiver;
   generating, using the microcontroller, a received signal strength indicator (RSSI) based on the measured signal strength;
   receiving, using the microcontroller, acceleration data from an accelerometer; and
   detecting an attack by comparing the RSSI against the acceleration data, including:
   acquiring the acceleration data from the accelerometer at two different points in time;
   computing a first distance an apparatus travels between the two different points in time based on the acceleration data;
   calculating a second distance based on the RSSI; and
   determining the attack has occurred if a difference between the first distance and the second distance is greater than a threshold.

4. The method of claim 3, further comprising:
   determining whether the apparatus is out of a wireless communication range of a vehicle; and
   disabling the wake receiver when the apparatus is out of the wireless communication range and is stationary.

5. The method of claim 4, wherein acquiring, the acceleration data from the accelerometer at the two different points in time upon determining the apparatus is outside the vehicle's wireless communication range.

* * * * *